US008978622B2

(12) United States Patent
Furuya (10) Patent No.: US 8,978,622 B2
(45) Date of Patent: Mar. 17, 2015

(54) AUTOMATIC CHOKE APPARATUS FOR ENGINE

(75) Inventor: Akira Furuya, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 423 days.

(21) Appl. No.: 13/423,438

(22) Filed: Mar. 19, 2012

(65) Prior Publication Data

US 2012/0247423 A1   Oct. 4, 2012

(30) Foreign Application Priority Data

Mar. 29, 2011  (JP) ................................. 2011-072869

(51) Int. Cl.
*F01N 5/02*   (2006.01)
*F02M 1/08*  (2006.01)
*F02M 1/10*  (2006.01)
*F01N 1/08*  (2006.01)

(52) U.S. Cl.
CPC .. *F02M 1/10* (2013.01); *F01N 5/02* (2013.01); *F01N 1/084* (2013.01); *Y02T 10/16* (2013.01)
USPC ...................................... 123/337; 123/179.18

(58) Field of Classification Search
CPC ............. F02M 1/10; F02M 1/02; F02M 1/08; F02N 5/02
USPC ............................................ 123/337, 179.18
See application file for complete search history.

(56) References Cited

U.S. PATENT DOCUMENTS

| 1,792,884 | A | * | 2/1931 | Wright ........................... 123/393 |
| 1,996,245 | A | | 4/1935 | Hunt |
| 2,757,652 | A | * | 8/1956 | Rothwell ..................... 123/54.7 |
| 2,995,348 | A | | 8/1961 | Eberhardt |
| 3,126,878 | A | * | 3/1964 | Eiler ............................. 261/39.1 |
| 3,529,585 | A | | 9/1970 | Stoltman |
| 3,828,745 | A | * | 8/1974 | Medrick ....................... 261/39.3 |
| 3,837,628 | A | | 9/1974 | Bartholomew |
| 3,947,531 | A | | 3/1976 | Branigin |
| 4,137,283 | A | | 1/1979 | Couderc |
| 4,465,640 | A | | 8/1984 | Dougherty |
| 4,848,082 | A | * | 7/1989 | Takahashi et al. .............. 60/285 |
| 5,069,180 | A | * | 12/1991 | Schmidt et al. ............... 123/376 |

(Continued)

FOREIGN PATENT DOCUMENTS

| JP | 04-262043 | | 9/1992 |
| JP | 06-050211 | A | 2/1994 |

(Continued)

*Primary Examiner* — Hieu T Vo
*Assistant Examiner* — Arnold Castro
(74) *Attorney, Agent, or Firm* — Smith, Gambrell & Russell, LLP (57) ABSTRACT

There is provided an automatic choke apparatus for an engine. A bimetal that is coupled to a choke valve of an intake system is provided in the vicinity of an outer wall face of a muffler. The muffler is divided into a first expansion chamber and a second expansion chamber across a partition plate. An exhaust hole that allows the expansion chambers to be communicated with each other is formed at the lower part of the partition plate. An exhaust gas is guided from the upstream first expansion chamber toward the downstream second expansion chamber through the exhaust hole. A bypass hole is formed at an upper part of the partition plate in such a manner that that the expansion chambers are communicated with each other as bypassing the exhaust hole. The bypass hole is open to the vicinity of the outer wall face opposite to the bimetal.

6 Claims, 11 Drawing Sheets

(56) References Cited

U.S. PATENT DOCUMENTS

| | | | |
|---|---|---|---|
| 5,176,855 A | 1/1993 | Jones | |
| 6,990,969 B2* | 1/2006 | Roth et al. | 123/676 |
| 7,144,000 B2 | 12/2006 | Roth et al. | |
| 7,331,326 B2 | 2/2008 | Arai et al. | |
| 7,628,387 B1 | 12/2009 | Clouse et al. | |
| 8,261,712 B2* | 9/2012 | Sotiriades | 123/179.18 |
| 8,495,995 B2* | 7/2013 | Drew et al. | 123/676 |
| 8,695,950 B2* | 4/2014 | Takesue | 261/39.3 |
| 8,746,207 B2* | 6/2014 | Drew et al. | 123/276 |
| 2005/0022798 A1* | 2/2005 | Roth et al. | 123/676 |
| 2005/0194701 A1* | 9/2005 | Moriyama et al. | 261/39.4 |
| 2006/0043620 A1* | 3/2006 | Roth et al. | 261/52 |
| 2006/0043621 A1* | 3/2006 | Roth et al. | 261/52 |
| 2009/0301072 A1* | 12/2009 | Sotiriades | 60/320 |
| 2011/0315133 A1* | 12/2011 | Drew et al. | 123/676 |

FOREIGN PATENT DOCUMENTS

| | | |
|---|---|---|
| JP | 7-145757 | 6/1995 |
| JP | 08-291764 | 5/1996 |

* cited by examiner

AUTOMATIC CHOKE APPARATUS FOR ENGINE

CROSS-REFERENCE TO RELATED APPLICATIONS

The present application claims priority from Japanese Patent Application No. 2011-072869 filed on Mar. 29, 2011, the entire contents of which are hereby incorporated by reference.

BACKGROUND OF THE INVENTION

1. Field of the Invention

The present invention relates to an automatic choke apparatus for an engine, the automatic choke apparatus utilizing heat of an exhaust system so as to operate a choke valve in an intake system.

2. Description of Related Art

A choke valve is provided to a carburetor, which constitutes an intake system of an engine, in order to enhance starting performance of the engine at a low temperature. An intake air amount is reduced by closing the choke valve, whereby an air-fuel mixture can be thickened. Accordingly, the engine can satisfactorily be started. As described above, when the engine is started, the choke valve is closed to thicken the air-fuel mixture. Therefore, it is necessary to open the choke valve so as to appropriately adjust the air-fuel mixture after the warm-up of the engine.

In order to automate such a operation choke valve, an automatic choke apparatus that operates a choke valve by a bimetal has been proposed (see, for example, Japanese Patent Application Laid-Open No. H7-145757). This automatic choke apparatus has a bimetal in the vicinity of a muffler, and operates the choke valve using the bimetal in a closing direction when an engine is started (when the muffler is at a low temperature), while it operates the choke valve in an opening direction after the warm-up of the engine (when the muffler is at a high temperature).

As described above, the choke valve has to be rapidly opened after the completion of the warm-up in order to appropriately adjust the air-fuel mixture supplied to the engine. However, it is difficult to open the choke valve according to the completion of the warm-up, depending upon a mounting condition of a bimetal. Specifically, exhaust gas flowing in the muffler is guided from an upstream expansion chamber toward a downstream expansion chamber, and immediately after the start of the engine, there is a great difference in a temperature distribution in the muffler. The mounting condition of the bimetal disposed in the vicinity of the muffler is limited by a layout of an intake/exhaust system or a shape of an engine. When there is a great variation in the temperature distribution in the muffler, and the mounting position of the bimetal is limited, it is impossible to mount the bimetal at a high-temperature portion of the muffler. Therefore, it is difficult to rapidly heat the bimetal after the start of the engine. The delay in the release of the choke valve due to the delay in heating the bimetal might cause an incomplete combustion of the engine due to excessive fuel. Therefore, it has been desired that the bimetal is rapidly heated, regardless of the mounting position of the bimetal.

SUMMARY OF THE INVENTION

An object of the present invention is to rapidly heat the bimetal, even when the mounting position of the bimetal is limited.

An aspect of the present invention provides an automatic choke apparatus for an engine that operates a choke valve in an intake system by utilizing a heat of an exhaust system, the automatic choke apparatus including: a bimetal coupled to the choke valve, the bimetal being disposed in a vicinity of an outer wall face of a muffler that is mounted to the engine; plural expansion chambers defined in the muffler; a connection channel that connects the expansion chambers each other in order to sequentially guide an exhaust gas from the upstream expansion chamber toward the downstream expansion chamber through the connection channel; and a bypass channel provided to the muffler in such a manner that the expansion chambers are communicated with each other as bypassing the connection channel. The exhaust gas is guided from the bypass channel to the expansion chamber that is defined at the inside of the outer wall face.

Preferably, the bypass channel should guide the exhaust gas from the expansion chamber at the most upstream side.

Preferably, the muffler should have three or more expansion chambers defined therein, and the bypass channel should guide the exhaust gas in such a manner that the exhaust gas bypasses one or more expansion chambers.

Preferably, the bypass channel is a through-hole formed on a partition plate that separates the expansion chambers.

Preferably, the bypass channel should be a pipe member having one end open to the expansion chamber at the upstream side and the other end open to the expansion chamber at the downstream side.

According to the present invention, the bypass channel is provided for allowing the expansion chambers to be communicated with each other in such a manner that the connection channel is bypassed. Therefore, the exhaust gas can be supplied to the expansion chamber near the bimetal, while the temperature drop of the exhaust gas can be suppressed. Consequently, even when the bimetal is disposed in the vicinity of the expansion chamber at the downstream side, the high-temperature exhaust gas can be guided from the expansion chamber at the upstream side through the bypass channel. Accordingly, the bimetal can be promptly heated immediately after the start of the engine. Accordingly, the choke valve can be promptly controlled after the start of the engine, whereby the incomplete combustion of the engine caused by excessive fuel can be prevented.

BRIEF DESCRIPTION OF THE DRAWINGS

FIG. 4A is a side view illustrating an exhaust system in FIG. 1 as enlarged, while

FIG. 6A is a sectional view illustrating the internal structure of the muffler taken along a line A-A in FIG. 5, while

FIG. 7A is a sectional view illustrating the internal structure of the muffler taken along a line B-B in FIG. 5, while

FIG. 10A is a sectional view illustrating the internal structure of the muffler taken along a line A-A in FIG. 9, while FIG. 11A is a sectional view illustrating the internal structure of the muffler taken along a line B-B in FIG. 9, while

DETAILED DESCRIPTION OF THE PREFERRED EMBODIMENTS

Figure 1:
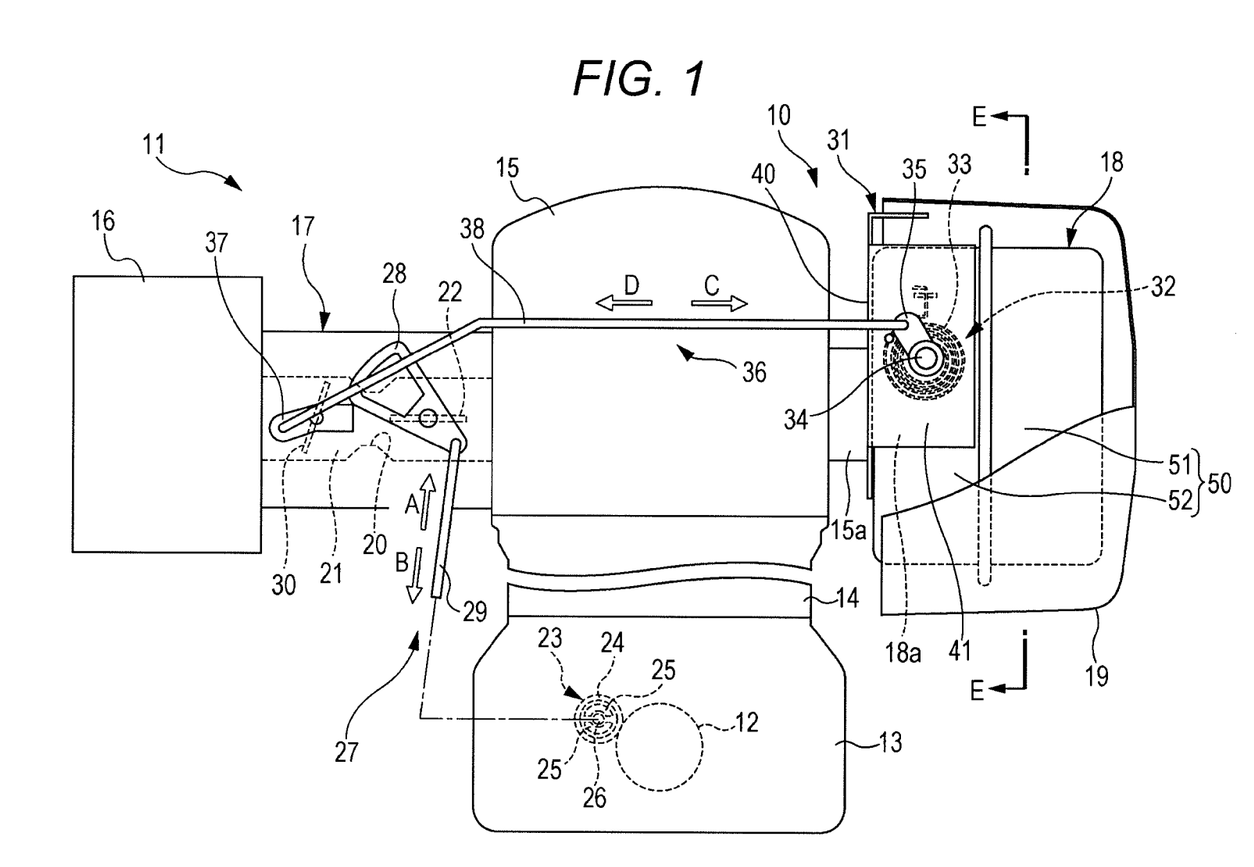
FIG. 1 is a side view schematically illustrating an engine provided with an automatic choke apparatus according to one embodiment of the present invention.
Figure 2:
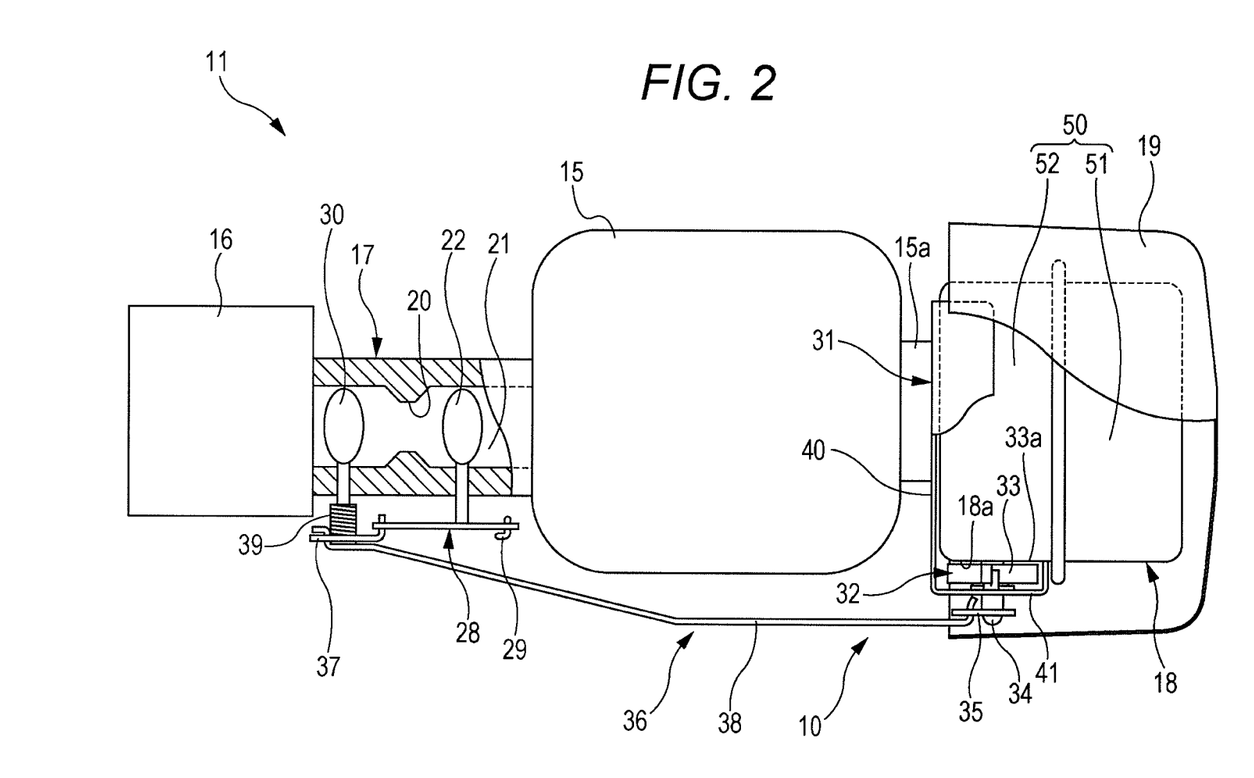
FIG. 2 is a plan view schematically illustrating the engine in FIG. 1 as viewed from top.

Embodiments of the present invention will be explained in detail below with reference to the drawings. FIG. 1 is a side view schematically illustrating an engine 11 provided with an automatic choke apparatus 10 according to one embodiment of the present invention. FIG. 2 is a plan view schematically illustrating the engine 11 in FIG. 1 as viewed from top. As illustrated in FIGS. 1 and 2, the engine 11 includes a crankcase 13 that stores a crankshaft 12. A cylinder 14 is attached at an upper end of the crankcase 13, and a cylinder head 15 is mounted to an upper end of the cylinder 14. An air cleaner 16 and a carburetor 17, which constitute an intake system, are connected to an unillustrated intake port of the cylinder head 15. Further, a muffler 18 constituting an exhaust system is connected to an unillustrated exhaust port of the cylinder head 15. A muffler cover 19 is attached to the muffler 18.

An intake channel 21 provided with a venturi portion 20 is formed on the carburetor 17, and a throttle valve 22 is provided at the downstream side of the venturi portion 20. A governor mechanism 23 is accommodated in the crankcase 13 in order to control the throttle valve 22 of the carburetor 17. The governor mechanism 23 has a governor case 24 that is rotated by the crankshaft 12. A weight 25 that tilts with a centrifugal force is provided in the governor case 24, and a push rod 26 that is pushed out by the tilting operation of the weight 25 is also provided. A link mechanism 27 is provided between the governor mechanism 23 and the throttle valve 22 in order to transmit the operation of the governor mechanism 23 to the throttle valve 22. A throttle lever 28 connected to the throttle valve 22 and the push rod 26 of the governor mechanism 23 are coupled through a throttle rod 29.

When the push rod 26 is pushed out due to the increase in the engine revolution, the throttle rod 29 moves in a direction of an arrow A against an unillustrated governor spring, whereby the throttle lever 28 is operated in such a direction as to close the throttle valve 22. On the other hand, when the force of pushing out the push rod 26 is reduced due to the decrease in the engine revolution, the throttle rod 29 is moved in a direction of an arrow B by the governor spring, whereby the throttle lever 28 is operated in such a direction as to open the throttle valve 22. Since the governor mechanism 23 that operates according to the engine revolution is provided as described above, the throttle lever 28 is controlled so as to keep the engine revolution constant.

A choke valve 30 is provided at the upstream side of the venturi portion 20 of the carburetor 17. A bimetal 32 is mounted to a heat shield plate 31 that covers a part of the muffler 18 in order to control the choke valve 30 of the carburetor 17. The bimetal 32 is a swirling-type (spiral-type) formed by winding a long metal plate 33. A bimetal lever 35 is mounted to an end of the metal plate 33, located at the center of the bimetal 32, through a rotation shaft 34. The metal plate 33 constituting the bimetal 32 is formed by bonding two metal materials, which have different thermal expansion coefficient, and it can swing the bimetal lever 35 according to the temperature of the bimetal 32 heated by the muffler 18. A link mechanism 36 is provided between the bimetal 32 and the choke valve 30 in order to transmit the operation of the bimetal 32 to the choke valve 30. A choke lever 37 connected to the choke valve 30 and the bimetal lever 35 of the bimetal 32 are coupled through a choke rod 38.

When the temperature of the muffler 18 increases to thereby increase the expansion force of the bimetal 32, the choke rod 38 moves in a direction of an arrow C against a return spring 39, whereby the choke lever 37 is operated in such a direction as to open the choke valve 30. On the other hand, when the temperature of the muffler 18 decreases to thereby reduce the expansion force of the bimetal 32, the choke rod 38 moves in a direction of an arrow D by the return spring 39, whereby the choke lever 37 is operated in such a direction as to close the choke valve 30. Since the bimetal 32 that operates according to the temperature of the muffler is provided as described above, the choke valve 30 can be closed upon the start of the engine when the temperature of the muffler decreases, while the choke valve 30 can be opened after the warm-up of the engine when the temperature of the muffler increases.

Figure 3A:
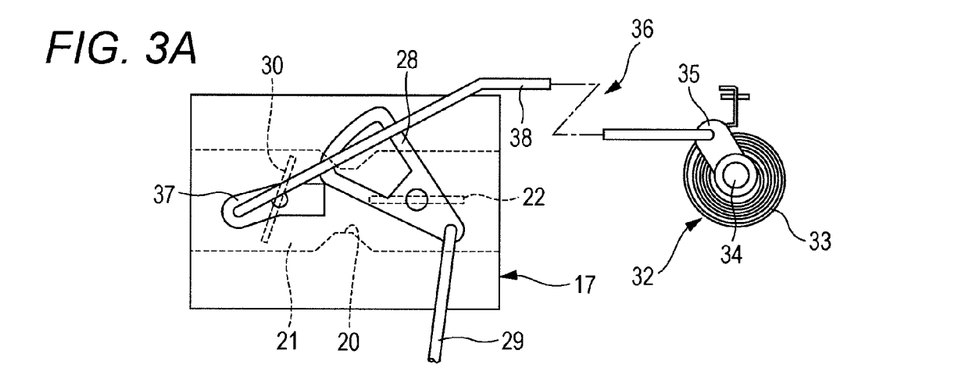
FIGS. 3A to 3C are explanatory views for describing an operation procedure of a throttle valve and a choke valve.
Figure 3B:
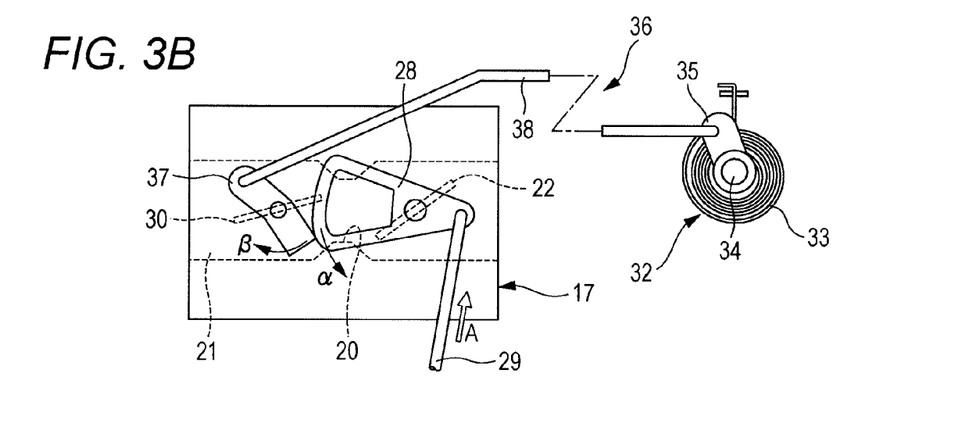
Figure 3C:
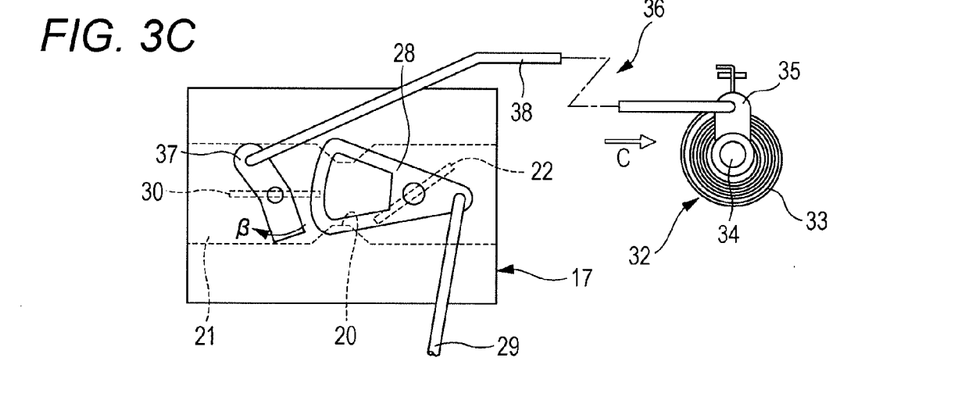

Subsequently, the operations of the throttle valve 22 and the choke valve 30 described above will be described. FIGS. 3A to 3C are explanatory views for describing the operation procedure of the throttle valve 22 and the choke valve 30. As illustrated in FIG. 3A, upon the start of the engine, the throttle valve 22 is controlled to be fully opened with the stop of the governor mechanism 23, and the choke valve 30 is controlled to be fully closed due to the temperature drop of the muffler. As described above, upon the start of the engine, the choke valve 30 is closed, so that the air-fuel mixture is thickened, whereby the engine 11 can satisfactorily be started.

Next, when the engine 11 is started, the governor mechanism 23 is operated with the increased engine revolution, whereby the throttle rod 29 is driven in the direction of the arrow A, as illustrated in FIG. 3B. The throttle lever 28 is driven in a direction of an arrow α, and the choke lever 37 that is in contact with the throttle lever 28 is driven in a direction of an arrow β. Thus, the throttle valve 22 is controlled to be in the closing direction in order to suppress the increase in the engine revolution, and the choke valve 30 is controlled to be in the opening direction so as to dilute the air-fuel mixture.

When the temperature of the muffler increases with the warming up of the engine 11, the bimetal 32 expands, whereby the choke rod 38 is driven in the direction of the arrow C, as illustrated in FIG. 3C. Thus, the choke lever 37 becomes apart from the throttle lever 28, and is driven in the direction of the arrow β, whereby the choke valve 30 is controlled to be fully opened so as to dilute the thick air-fuel mixture that was relied upon at the start. In order to open the choke valve 30 according to the completion of the warming up of the engine 11, it is important to rapidly heat the bimetal 32 upon the start of the engine.

Figure 4A:
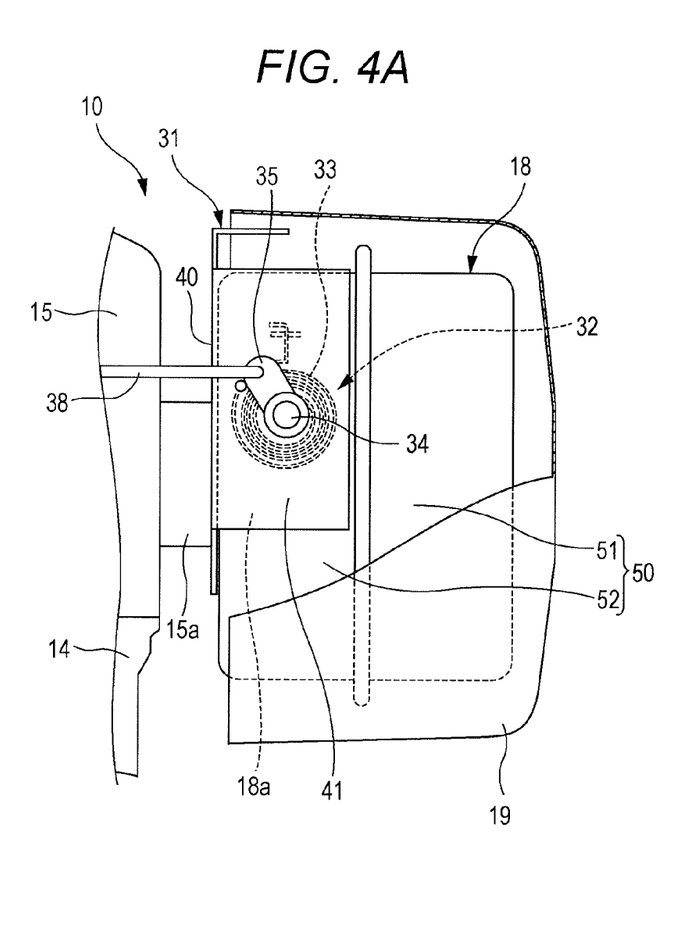
Figure 4B:
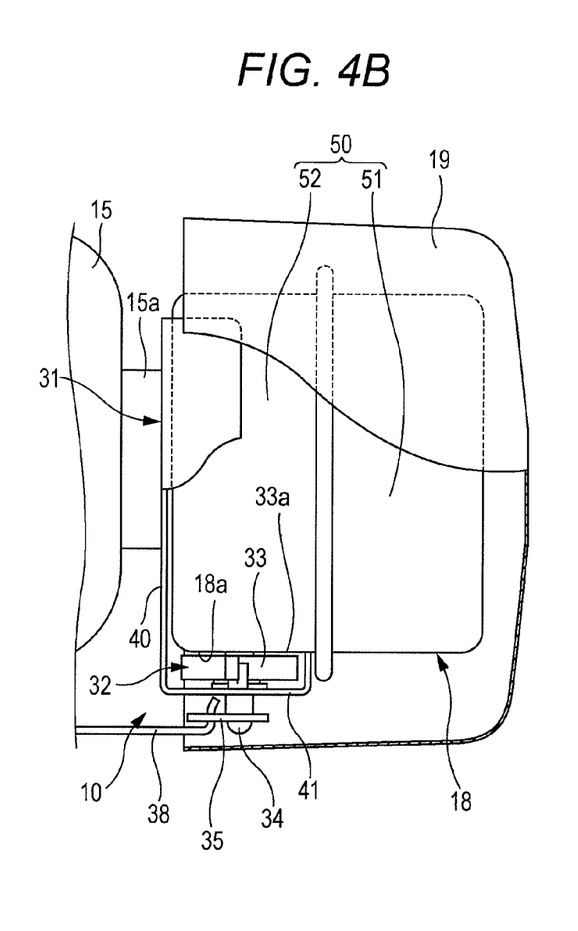
FIG. 4B is a plan view illustrating an exhaust system in FIG. 2 as enlarged.

Subsequently, a mounting structure of the bimetal 32 to the muffler 18 and an internal structure of the muffler 18 for rapidly heating the bimetal 32 are described. FIG. 4A is a side view illustrating an exhaust system in FIG. 1 as enlarged, while FIG. 4B is a plan view illustrating an exhaust system in FIG. 2 as enlarged. As illustrated in FIGS. 4A and 4B, the heat shield plate 31 is sandwiched between an exhaust pipe 15a extending from the cylinder head 15 and the muffler 18 assembled to the exhaust pipe 15a. The heat shield plate 31 has a substrate portion 40 that is sandwiched between the cylinder head 15 and the muffler 18, and a mounting plate portion 41 that is bent at substantially a right angle from the substrate portion 40. The bimetal 32 is disposed at the inside of the mounting plate portion 41 of the heat shield plate 31. An outer wall face 18a of the muffler 18 and an end face 33a of the metal plate 33 in the widthwise direction oppose to each other.

Figure 5:
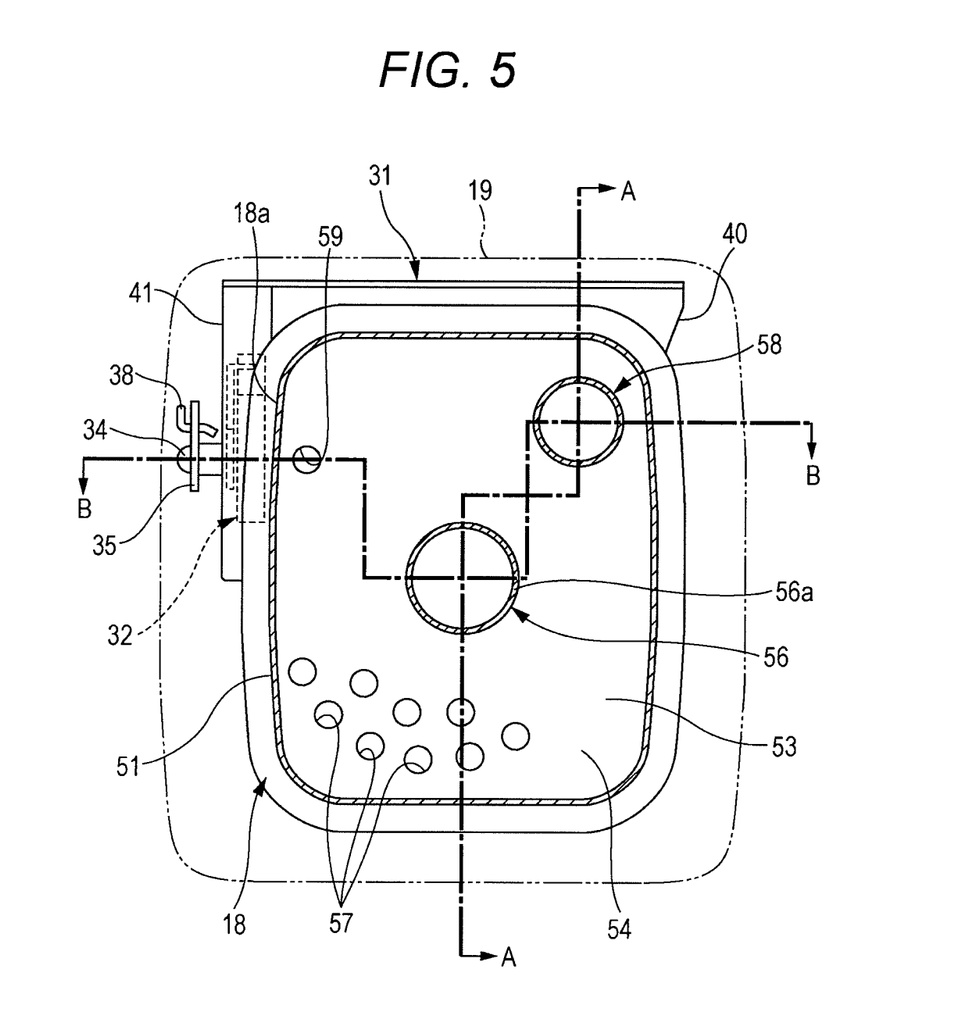
FIG. 5 is a sectional view illustrating an internal structure of a muffler taken along a line E-E in FIG. 1.
Figure 6A:
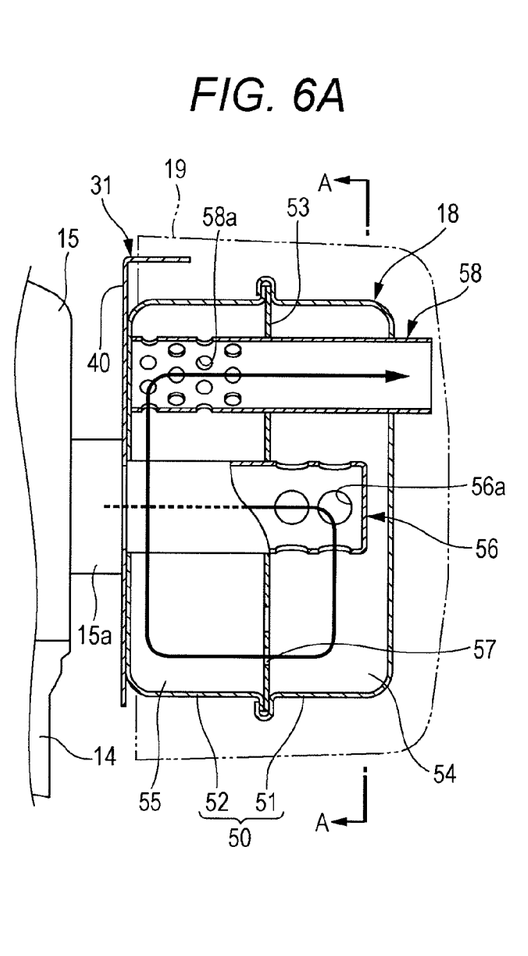
Figure 6B:
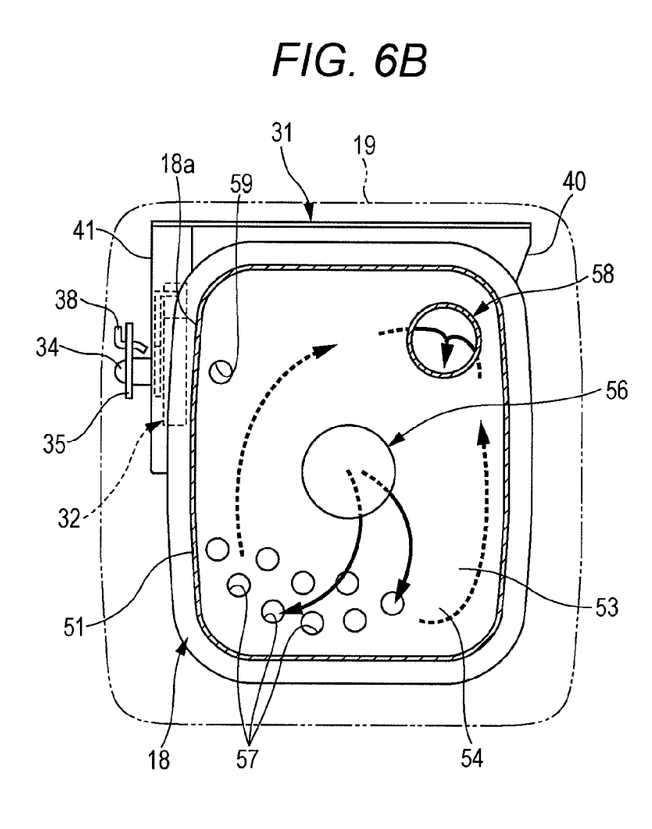
FIG. 6B is a sectional view illustrating the internal structure of the muffler taken along a line A-A in FIG. 6A.

FIG. 5 is a sectional view illustrating the internal structure of the muffler 18 taken along a line E-E in FIG. 1. FIG. 6A is a sectional view illustrating the internal structure of the muffler 18 taken along a line A-A in FIG. 5, while FIG. 6B is a sectional view illustrating the internal structure of the muffler 18 taken along a line A-A in FIG. 6A. As illustrated in FIGS. 5 and 6, the muffler 18 has a muffler body 50 having a substantially rectangular solid. The muffler body 50 is formed by bonding a first shell 51 and a second shell 52. A partition plate 53 is sandwiched between the first shell 51 and the second shell 52, wherein the muffler body 50 is divided into a first expansion chamber 54 and a second expansion chamber 55 across the partition plate 53. An input pipe 56 formed with plural communication holes 56a is attached to the muffler 18. The exhaust port and the first expansion chamber 54 communicate with each other via the input pipe 56. Plural exhaust holes 57 are formed at the lower part of the partition plate 53 as connection channels. The first expansion chamber 54 and the second expansion chamber 55 communicate with each other via the exhaust holes 57. Further, an output pipe 58 formed with plural communication holes 58a is attached to the muffler 18. The second expansion chamber 55 communicates with the outside through the output pipe 58.

With this structure, the exhaust gas in the engine 11 passes through the input pipe 56, the first expansion chamber 54, the exhaust holes 57, the second expansion chamber 55, and the output pipe 58, in this order, and then, is exhausted to the outside from the end of the output pipe 58, as indicated by arrows in FIGS. 6A and 6B. Specifically, the first expansion chamber 54 serves as an expansion chamber (expansion chamber at the most upstream side) at the upstream side close to the exhaust port, while the second expansion chamber 55 serves as an expansion chamber at the downstream side apart from the exhaust port. The exhaust gas is guided from the upstream expansion chamber toward the downstream expansion chamber (first expansion chamber 54→second expansion chamber 55) through the exhaust holes 57 serving as the connection channel.

Figure 7A:
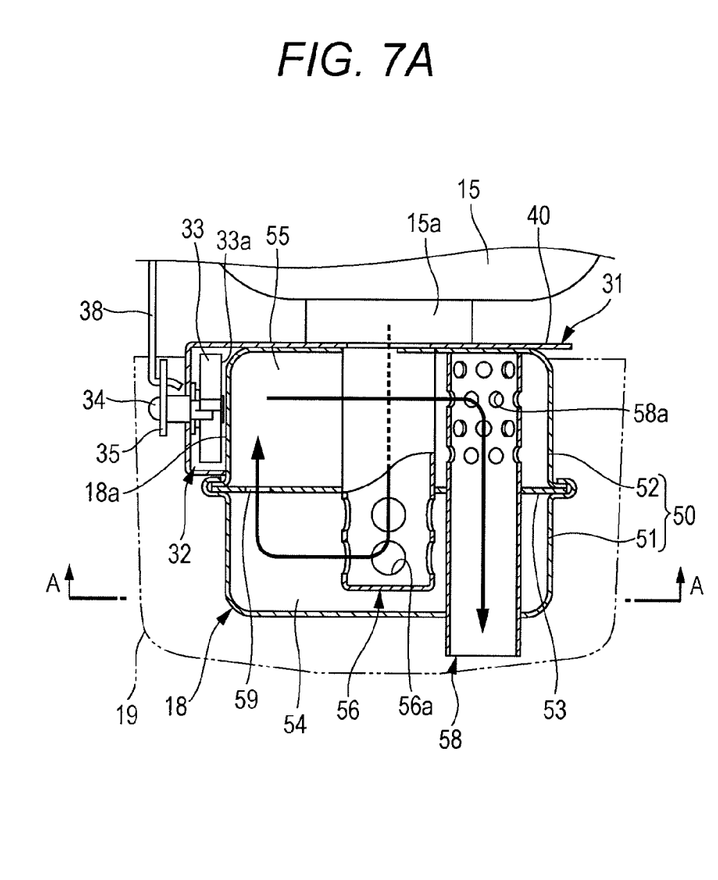
Figure 7B:
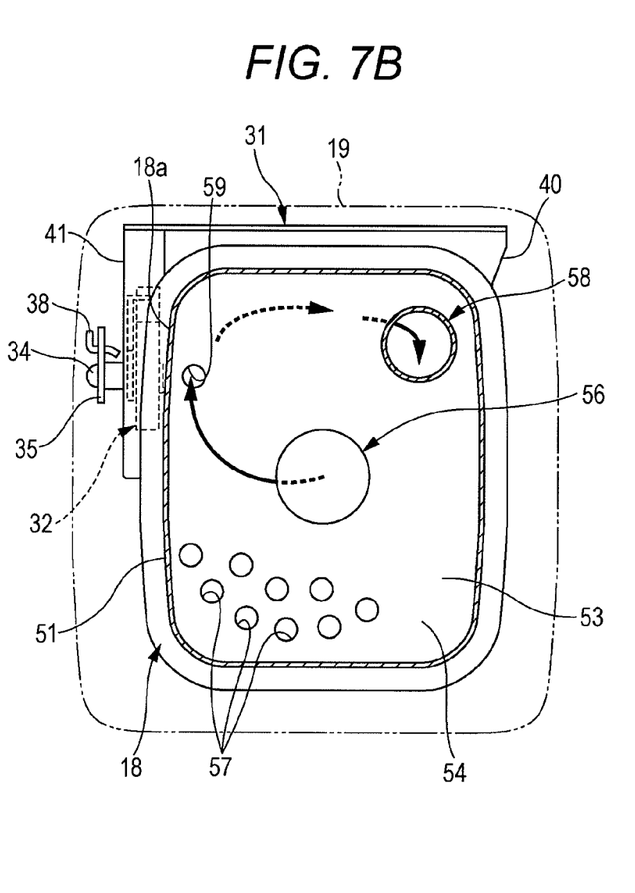
FIG. 7B is a sectional view illustrating the internal structure of the muffler taken along a line A-A in FIG. 7A.

FIG. 7A is a sectional view illustrating the internal structure of the muffler 18 taken along a line B-B in FIG. 5, while FIG. 7B is a sectional view illustrating the internal structure of the muffler 18 taken along a line A-A in FIG. 7A. A bypass hole (through-hole) 59 serving as a bypass channel is formed at an upper part of the partition plate 53 attached to the muffler 18. The first expansion chamber 54 and the second expansion chamber 55 communicate with each other through the bypass hole 59, as illustrated in FIGS. 7A and 7B. The bypass hole 59 on the partition plate 53 is formed to be open in the vicinity of the outer wall face 18a that is opposite to the bimetal 32. With the bypass hole 59 formed as described above, the exhaust gas can be supplied from the first expansion chamber 54 to the second expansion chamber 55 as bypassing the exhaust holes 57.

With this structure, the high-temperature exhaust gas can be guided from the first expansion chamber 54 at the upstream side (at the most upstream side) to the second expansion chamber 55, whereby the temperature of the second expansion chamber 55 in the vicinity of the bimetal can be promptly increased. Specifically, comparing the distance from the first expansion chamber 54 to the second expansion chamber 55 in the vicinity of the bimetal through the exhaust holes 57 and the distance from the first expansion chamber 54 to the second expansion chamber 55 in the vicinity of the bimetal through the bypass hole 59, the distance through the bypass hole 59 is shorter than the distance through the exhaust holes 57. When the exhaust gas can be supplied through the bypass hole 59, the distance by which the exhaust gas reaches the vicinity of the bimetal can be shortened, thereby preventing the temperature drop of the exhaust gas supplied to the vicinity of the bimetal. Thus, the high-temperature exhaust gas can be blown to the vicinity of the bimetal, resulting in that the bimetal 32 can be promptly heated immediately after the start of the engine.

As described thus far, the bypass hole 59, by which the exhaust gas bypasses the exhaust holes 57, is formed on the partition plate 53, whereby the exhaust gas can be supplied to the second expansion chamber 55, while the temperature drop of the exhaust gas can be suppressed. Consequently, even when the bimetal 32 is disposed in the vicinity of the second expansion chamber 55 at the downstream side due to the shape of the engine or the like, the high-temperature exhaust gas can be supplied to the second expansion chamber 55 through the bypass hole 59. Accordingly, the bimetal 32 can be promptly heated immediately after the start of the engine. Even when the bimetal 32 is disposed in the vicinity of the second expansion chamber 55 at the downstream side, the choke valve 30 can be promptly opened after the engine 11 is started, thereby preventing the incomplete combustion of the engine 11 caused by excessive fuel. Since the structure is simple in which the bypass hole 59 is formed on the partition plate 53, the increase in the number of components and the increase in the processing cost can be suppressed.

Figure 8:
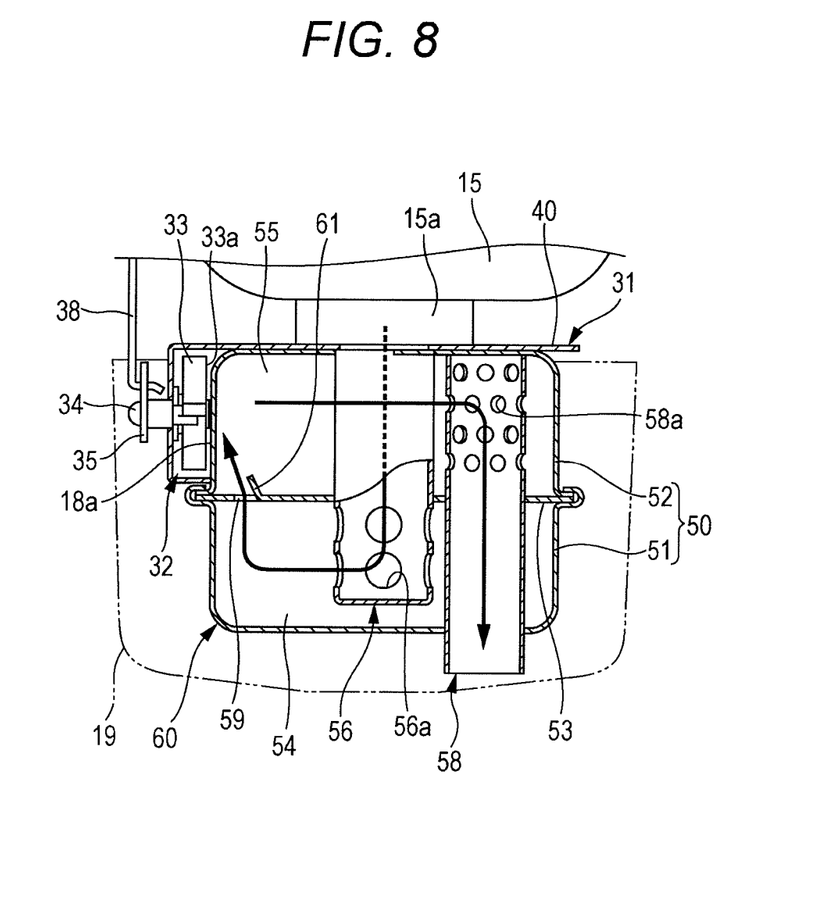
FIG. 8 is a sectional view illustrating an internal structure of a muffler provided to an automatic choke apparatus according to another embodiment of the present invention.

In the above description, the bypass hole 59 is formed by punching the partition plate 53 in the form of a circle. However, the present invention is not limited thereto. When the bypass hole 59 is formed, a punched plate piece 61 may be left. FIG. 8 is a sectional view illustrating an internal structure of a muffler 60 provided to an automatic choke apparatus according to another embodiment of the present invention. FIG. 8 illustrates the same portion illustrated in FIG. 7A. The members in FIG. 8 same as those in FIG. 7A are identified by the same numerals, and the description thereof are omitted. As illustrated in FIG. 8, the bypass hole 59 is formed on the partition plate 53, and further, the plate piece 61 that is punched upon forming the bypass hole 59 is left on the partition plate 53. The plate piece 61 tilts toward the bimetal 32, whereby the direction of the flow of the exhaust gas passing through the bypass hole 59 is directed toward the bimetal since the exhaust gas contacts the plate piece 61, as indicated by an arrow in FIG. 8. Thus, the exhaust gas passing through the bypass hole 59 can efficiently be blown to the bimetal 32. Therefore, the bimetal 32 can be promptly heated immediately after the start of the engine.

Figure 9:
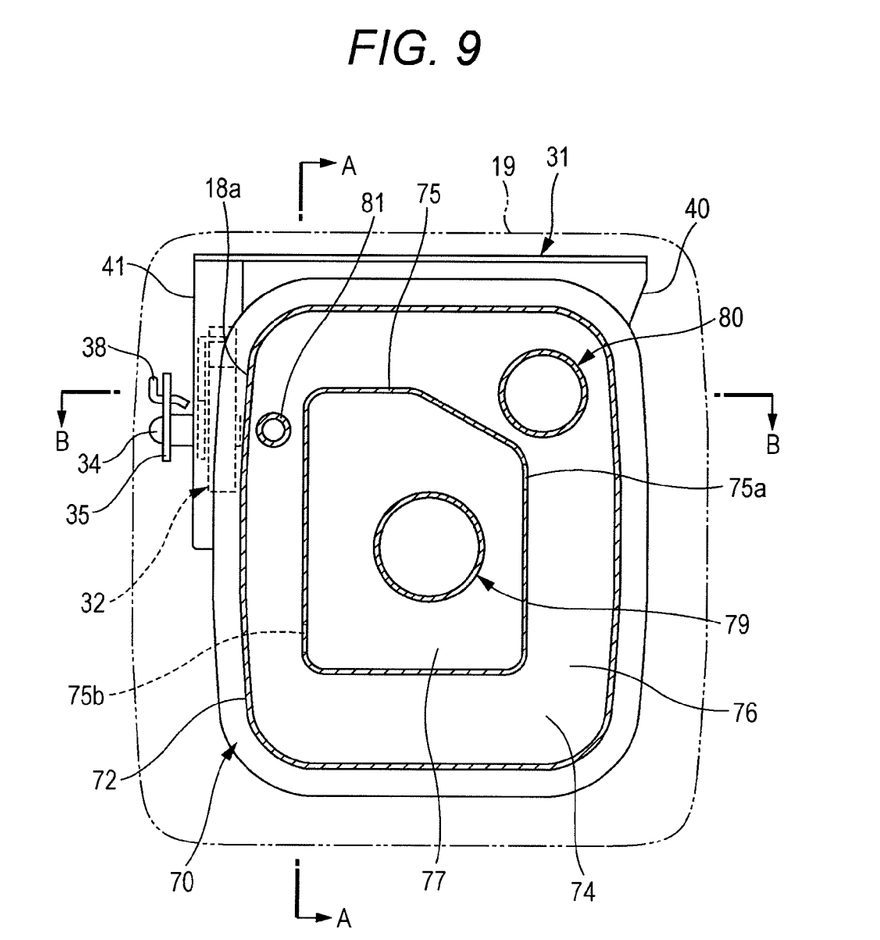
FIG. 9 is a sectional view illustrating an internal structure of a muffler provided to an automatic choke apparatus according to another embodiment of the present invention.
Figure 10A:
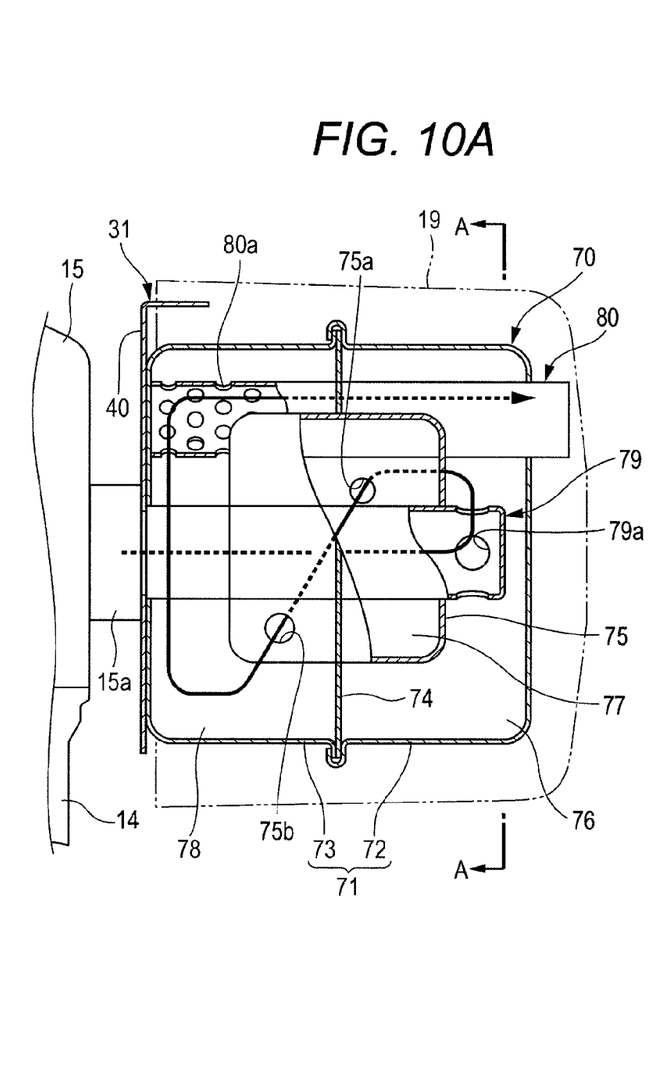
Figure 10B:
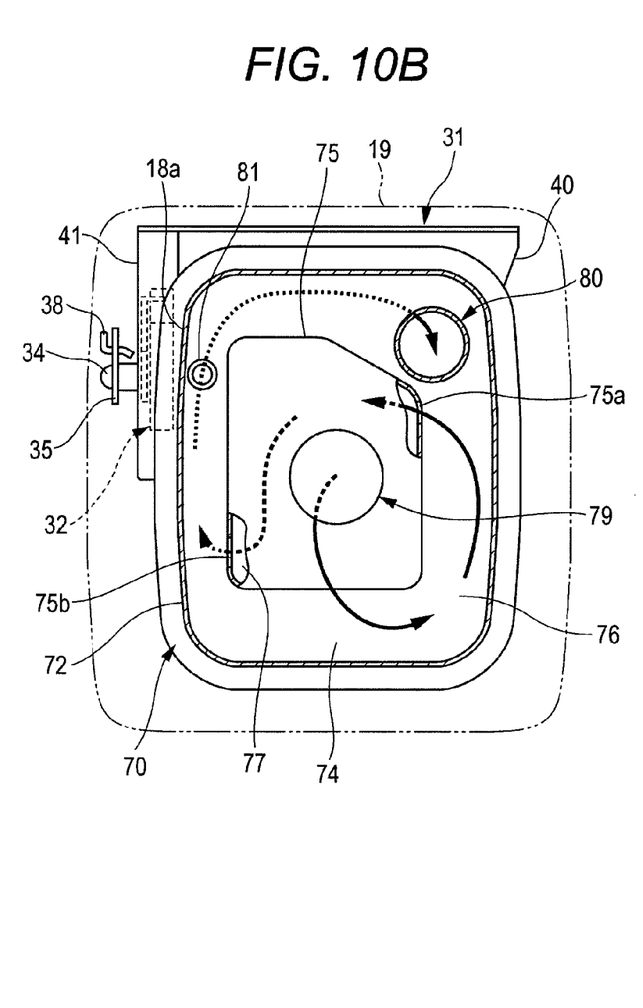
FIG. 10B is a sectional view illustrating the internal structure of the muffler taken along a line A-A in FIG. 10A.

In the above description, two chambers 54 and 55 are defined in the mufflers 18 and 60. However, the present invention is not limited thereto. Three or more chambers may be defined in the mufflers 18 and 60. In the above description, the bypass hole 59 is formed on the partition plate 53 as the bypass channel. However, the present invention is not limited thereto. A pipe member serving as the bypass channel may be assembled in the mufflers 18 and 60. FIG. 9 is a sectional view illustrating an internal structure of a muffler 70 provided to an automatic choke apparatus according to another embodiment of the present invention. FIG. 9 illustrates the same portion illustrated in FIG. 5. FIG. 10A is a sectional view illustrating the internal structure of the muffler 70 taken along a line A-A in FIG. 9, while FIG. 10B is a sectional view illustrating the internal structure of the muffler 70 taken along a line A-A in FIG. 10A. The members in FIGS. 9 and 10 same as those in FIGS. 5 and 6 are identified by the same numerals, and the description thereof are omitted.

As illustrated in FIGS. 9 and 10, the muffler 70 has a muffler body 71 having a substantially rectangular solid. The muffler body 71 is formed by bonding a first shell 72 and a second shell 73. A partition plate 74 is sandwiched between the first shell 72 and the second shell 73. A third shell 75 having a substantially rectangular solid is fixed to the partition plate 74. The muffler body 71 is divided into a first expansion chamber 76 and a third expansion chamber 78 across the partition plate 74, and the second expansion chamber 77 is defined in the third shell 75. An input pipe 79 formed with plural communication holes 79a is attached to the muffler 70. The exhaust port and the first expansion chamber 76 communicate with each other via the input pipe 79. An exhaust hole 75a, which is open to the first expansion chamber 76, and which serves as the connection channel, is formed on the third shell 75, while an exhaust hole 75b, which is open to the third expansion chamber 78, and which serves as the connection channel, is also formed on the third shell 75. The first expansion chamber 76 and the second expansion chamber 77 communicate with each other through the exhaust hole 75a, while the second expansion chamber 77 and the third expansion chamber 78 communicate with each other through the exhaust hole 75b. Further, an output pipe 80 formed with plural communication holes 80a is attached to the muffler 70. The third expansion chamber 78 and the outside communicate with each other through the output pipe 80.

With this structure, the exhaust gas in the engine 11 passes through the input pipe 79, the first expansion chamber 76, the exhaust hole 75a, the second expansion chamber 77, the exhaust hole 75b, the third expansion chamber 78, and the output pipe 80, in this order, and then, is exhausted to the outside from the end of the output pipe 80, as indicated by arrows in FIGS. 10A and 10B. Specifically, the first expansion chamber 76 serves as an expansion chamber (expansion chamber at the most upstream side) at the upstream side close to the exhaust port, the second expansion chamber 77 serves as an intermediate expansion chamber sandwiched between the first expansion chamber 76 and the third expansion chamber 78, and the third expansion chamber 78 serves as an expansion chamber at the downstream side apart from the exhaust port. The exhaust gas is guided from the upstream expansion chamber toward the downstream expansion chamber (first expansion chamber 76→second expansion chamber 77→third expansion chamber 78) through the exhaust holes 75a and 75b serving as the connection channels.

Figure 11A:
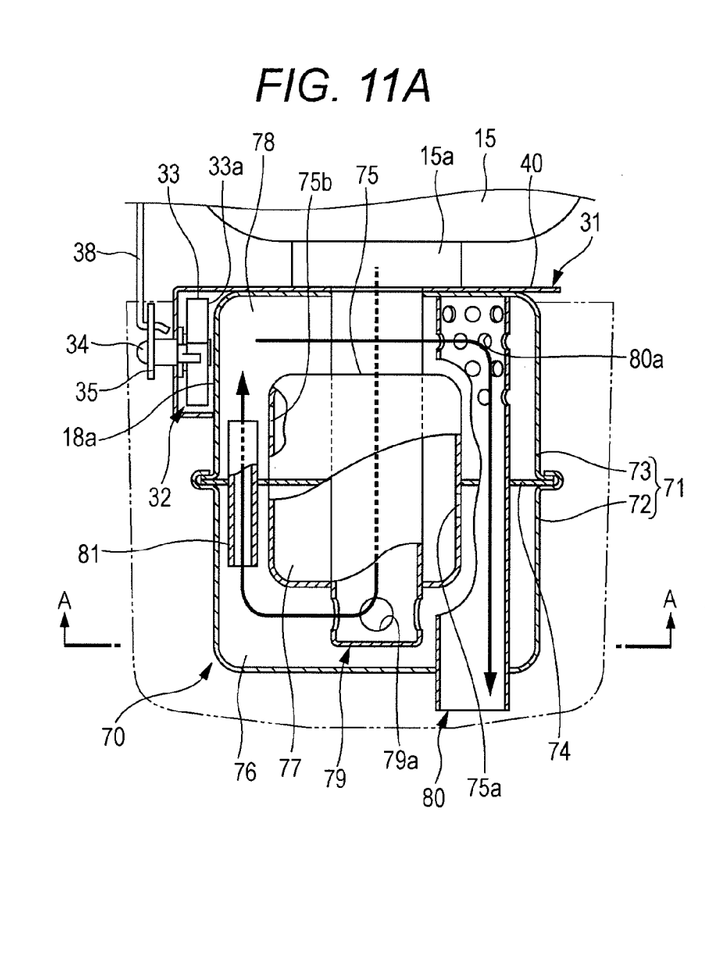
Figure 11B:
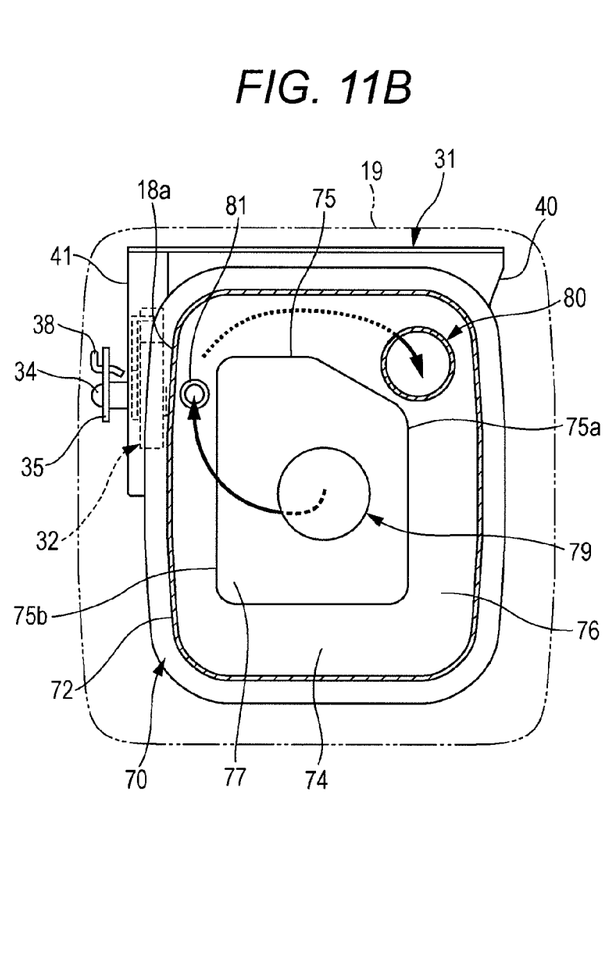
FIG. 11B is a sectional view illustrating the internal structure of the muffler taken along a line A-A in FIG. 11A.

FIG. 11A is a sectional view illustrating the internal structure of the muffler 70 taken along a line B-B in FIG. 9, while FIG. 11B is a sectional view illustrating the internal structure of the muffler 70 taken along a line A-A in FIG. 11A. The members in FIG. 11 same as those in FIG. 7 are identified by the same numerals, and the description thereof are omitted. As illustrated in FIGS. 11A and 11B, a bypass pipe (pipe member) 81 serving as a bypass channel is fixed at the upper portion of the partition plate 74 as extending through the partition plate 74. One end of the bypass pipe 81 is open to the first expansion chamber 76, while the other end is open to the third expansion chamber 78. The first expansion chamber 76 and the third expansion chamber 78 communicate with each other through the bypass pipe 81. The end of the bypass pipe 81 located near the third expansion chamber 78 is formed to be open to the vicinity of the outer wall face 18a opposite to the bimetal 32. By providing the bypass pipe 81 as described above, the exhaust gas can be supplied to the third expansion chamber 78 from the first expansion chamber 76 as bypassing the exhaust holes 75a and 75b and the second expansion chamber 77.

With this structure, the high-temperature exhaust gas can be guided from the first expansion chamber 76 at the upstream side (at the most upstream side) to the third expansion chamber 78, whereby the temperature of the third expansion chamber 78 in the vicinity of the bimetal can be promptly increased. Specifically, comparing the distance from the first expansion chamber 76 to the third expansion chamber 78 in the vicinity of the bimetal through the exhaust holes 75a and 75b and the second expansion chamber 77, and the distance from the first expansion chamber 76 to the third expansion chamber 78 in the vicinity of the bimetal through the bypass pipe 81, the distance through the bypass pipe 81 is shorter. When the exhaust gas can be supplied through the bypass pipe 81, the distance by which the exhaust gas reaches the vicinity of the bimetal can be shortened, thereby preventing the temperature drop of the exhaust gas supplied to the vicinity of the bimetal. Thus, the high-temperature exhaust gas can be blown to the vicinity of the bimetal, resulting in that the bimetal 32 can be promptly heated immediately after the start of the engine.

The present invention is not limited to the embodiments above, and various modifications are possible without departing from the scope of the present invention. For example, although the bypass hole 59 is formed as the bypass channel in FIG. 5, the present invention is not limited thereto. A pipe member may be provided as the bypass channel. In FIG. 9, the bypass pipe 81 is provided as the bypass channel. However, the present invention is not limited thereto. A through-hole may be formed as the bypass channel. In FIG. 11, the bypass pipe 81 extending straight is provided as the bypass channel. However, the present invention is not limited thereto. A bypass pipe may be provided that is bent toward the bimetal 32.

What is claimed is:

1. An automatic choke apparatus for an engine that operates a choke valve in an intake system by utilizing a heat of an exhaust system, the automatic choke apparatus comprising:
    a bimetal coupled to the choke valve, the bimetal being disposed in a vicinity of an outer wall face of a muffler that is mounted to the engine;
    a plurality of expansion chambers defined in the muffler;
    a connection channel that connects a number of the plurality of expansion chambers with each other in order to sequentially guide an exhaust gas from an upstream expansion chamber toward a downstream expansion chamber through the connection channel; and
    a bypass channel provided to the muffler in such a manner that an upstream expansion chamber is communicated with a downstream expansion chamber so as to bypass the connection channel, wherein the exhaust gas is guided from the bypass channel to an expansion chamber that is defined at the inside of the outer wall face,
    wherein the plurality of expansion chambers comprises three or more expansion chambers defined in the muffler, and the bypass channel guides the exhaust gas in such a manner that the exhaust gas bypasses one or more expansion chambers.

2. The automatic choke apparatus for an engine according to claim 1, wherein
    the bypass channel is a through-hole formed on a partition plate that separates expansion chambers.

3. The automatic choke apparatus for an engine according to claim 1, wherein
the bypass channel is a pipe member having one end open to an expansion chamber at an upstream side of a flow-path for the exhaust gas and another end open to an expansion chamber at a downstream side of the flow-path for the exhaust gas.

4. An automatic choke apparatus for an engine that operates a choke valve in an intake system by utilizing a heat of an exhaust system, the automatic choke apparatus comprising:
- a bimetal coupled to the choke valve, the bimetal being disposed in a vicinity of an outer wall face of a muffler that is mounted to the engine;
- a plurality of expansion chambers defined in the muffler;
- a connection channel that connects a number of expansion chambers with each other in order to sequentially guide an exhaust gas from an upstream expansion chamber toward a downstream expansion chamber through the connection channel; and
- a bypass channel provided to the muffler in such a manner that an upstream expansion chamber is communicated with a downstream expansion chamber so as to bypass the connection channel, wherein the exhaust gas is guided from the bypass channel to an expansion chamber that is defined at the inside of the outer wall face, wherein the bypass channel guides the exhaust gas from an expansion chamber at the most upstream side, the plurality of expansion chambers comprises three or more expansion chambers defined in the muffler, and the bypass channel guides the exhaust gas in such a manner that the exhaust gas bypasses one or more expansion chambers.

5. The automatic choke apparatus for an engine according to claim 4, wherein
the bypass channel is a through-hole formed on a partition plate that separates expansion chambers.

6. The automatic choke apparatus for an engine according to claim 4, wherein
the bypass channel is a pipe member having one end open to an expansion chamber at an upstream side of a flow-path for the exhaust gas and another end open to an expansion chamber at a downstream side of the flow-path for the exhaust gas.

\* \* \* \* \*